United States Patent [19]

Beck

[11] 3,967,449
[45] July 6, 1976

[54] OCEAN THERMAL GRADIENT POWER PLANT

[76] Inventor: Earl J. Beck, 3045 Grove St., Ventura, Calif. 93003

[22] Filed: May 29, 1975

[21] Appl. No.: 582,017

[52] U.S. Cl. ................................. 60/641; 60/398
[51] Int. Cl.² .......................................... F03G 7/04
[58] Field of Search .............................. 60/641, 398

[56] References Cited
UNITED STATES PATENTS

| | | | |
|---|---|---|---|
| 1,493,368 | 5/1924 | Merz | 60/641 |
| 1,952,520 | 3/1934 | Urquhart | 60/641 UX |
| 2,006,985 | 7/1935 | Claude et al. | 60/641 X |
| 2,461,449 | 2/1949 | Smith et al. | 60/641 X |
| 3,805,515 | 4/1974 | Zener | 60/641 |

*Primary Examiner*—Allen M. Ostrager
*Attorney, Agent, or Firm*—Richard S. Sciascia; Joseph M. St.Amand; Darrell E. Hollis

[57] ABSTRACT

An ocean thermal gradient power plant utilizing the concept of converting the potential and/or kinetic energy developed as a low pressure, high specific volume steam to a hydraulic or kinetic working head in seawater. The plant comprises a hull having a pair of air-evacuated, partially submerged compartments therein. Each compartment contains a static hydraulic head and is interconnected with the other compartment above the level of the static hydraulic heads. One compartment contains a steam-lift pump which, in addition to the static head therein, creates a hydraulic working head therein. The water from the hydraulic working head drives a turbine and then exits the compartment to an intermediate depth. Steam from the steam-lift pump is drawn into the other compartment where it is condensed by a barometric condenser. The water in this compartment exits via a pipe extending from the level of the static hydraulic head to an intermediate depth. A Taylor compressor is located at the orifice of the pipe to remove any collected air from the system.

50 Claims, 3 Drawing Figures

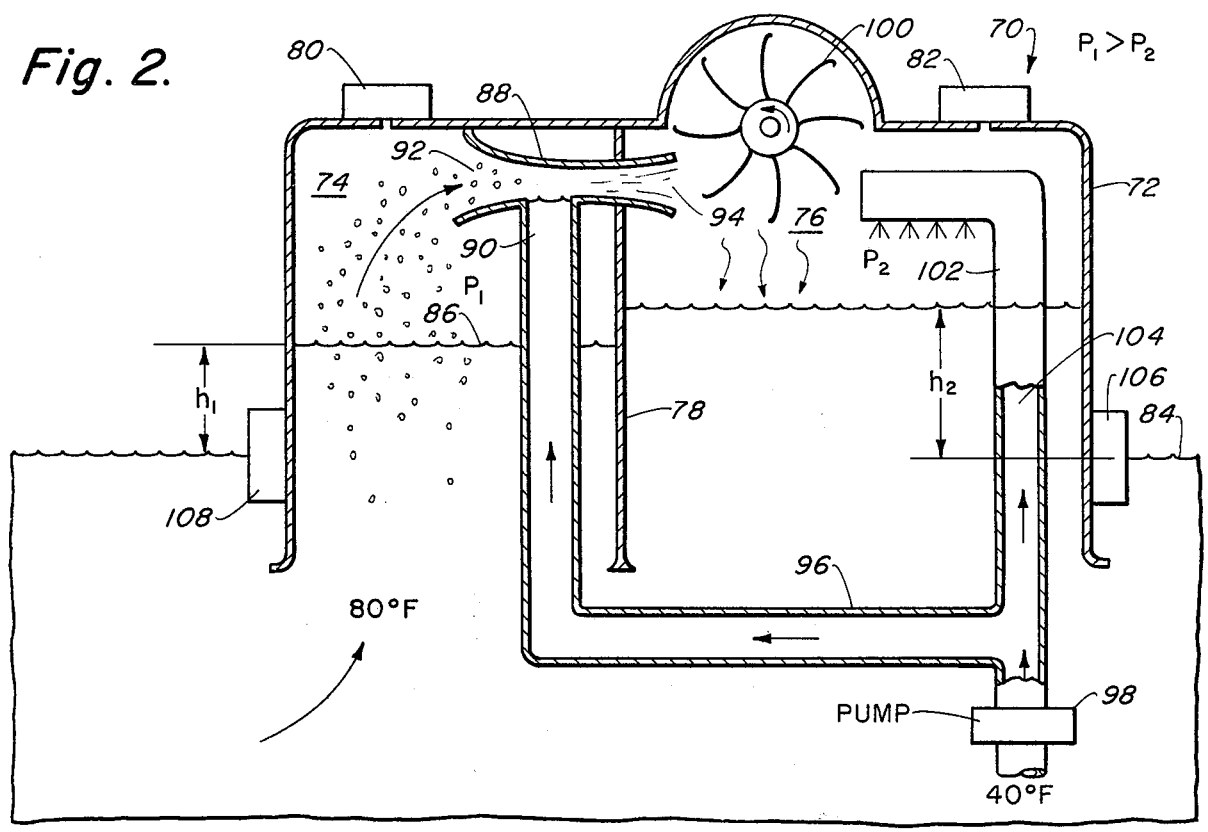
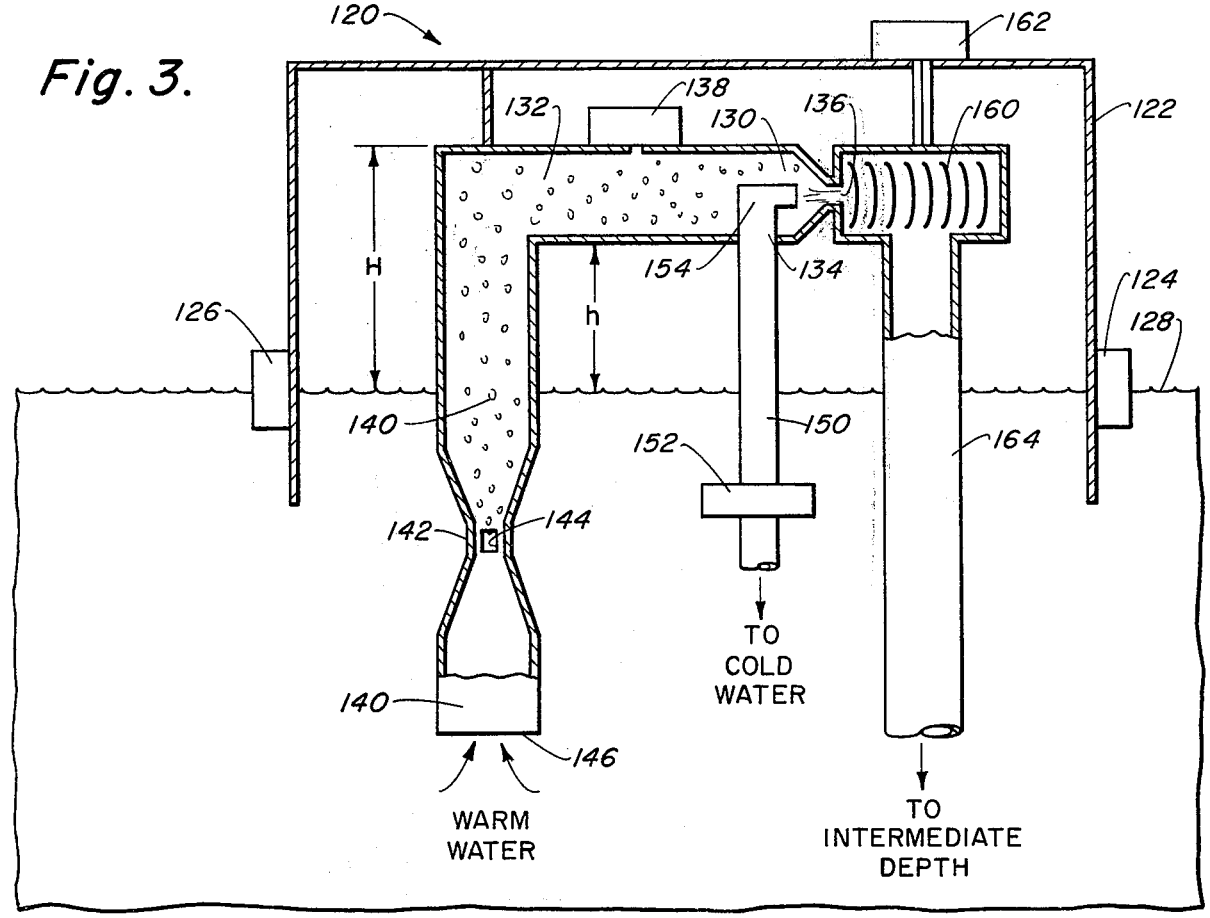

OCEAN THERMAL GRADIENT POWER PLANT

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

1. Field of the Invention

The present invention relates generally to ocean thermal gradient power plants and more particularly to such plants containing a minimum of moving parts.

2. Description of the Prior Art

Conventional power plants, both fuel burning and nuclear, utilize a cycle known as the Rankine cycle in which water in evaporated at high pressure, passed through a steam turbine and condensed at a low pressure. In the late 19th century, the French physicist, D'Arsonval suggested a similar cycle using the warm surface water in the tropics as a heat source and the cold deep water as the sink but using a selected working fluid (refrigerant) instead of water, to obtain more favorable characteristics in machinery, notably a smaller turbine than would be used for low pressure steam, if it were produced. The Rankine cycle is a "closed" cycle, in which the same refrigerant or working fluid is recycled time after time. This requires large heat transfer surfaces to evaporate and condense the refrigerant. Such a plant suffers an initial disadvantage in poor efficiency because of small temperature differences (typically on the order of 22°C or less), according to well recognized principles of thermodynamics, and the further deficiency of an upper limit in a "perfect" machine as described by S. Carnot. The potential for increased efficiency has moved the power industry to higher and higher boiler pressures and temperatures, and lower and better condensing temperatures to produce increasingly lower cost electricity. Modern steam plants are indeed efficient, and only because of drastically increasing fossil fuel costs has electricity become more expensive in the United States.

Unlike other power plants (except hydroelectric), the ocean thermal gradient power plant does not use fuel, but in its present closed cycle concepts requires a very expensive plant which until recently has been considered not to be cost effective. Many of these costs arise from the very large boilers and condensers necessary to achieve net power production and the very large anchors, moors, and structures necessary to contain the large machinery. In addition, large numbers of tubes in the boiler and condenser will foul with marine growth, a problem in conventional condensers using seawater as a coolant, and much worse in ocean thermal gradient closed cycle plants, as the surfaces will not be significantly warmer than the water, as they are in fossil fueled condensers.

A French scientist and engineer, George Claude, recognized the heat transfer problems, as he was somewhat of an expert for his time in the kind of evaporation and cooling of importance in the closed cycle plant, being a wealthy inventor who successfully liquified air. He chose to take a more direct route than suggested by D'Arsonval and in the 1920's built a plant on land in northern Cuba; he later did the same thing in a ship off South America. Rather than use of working fluid in a closed cycle, he chose to evaporate the warm, readily available surface water, pass it through a low pressure steam turbine and condense it with direct contact with cold water pumped from the deeps. The operation was not an overwhelming success as it failed to produce a system capable of displacing fossil fuel burning plants. Had Claude's overall operations been successful, extremely large turbines would have been required for producing the large blocks of power of interest to a late 20th century power-hungry civilization. They are simply beyond the present state of the art, although no one has shown them to be impossible designs.

While Claude's experiments were thermodynamic successes, they were ocean engineering disasters. To bring the cold, deep waters from the ocean's depths to the surface, Claude was forced to utilize very large pipes or syphons and these proved too fragile to withstand the ocean's forces.

SUMMARY OF THE INVENTION

In order to overcome the above enumerated disadvantages, the present invention contemplates an ocean thermal gradient hydraulic power plant capable of developing a continuous working head of sea water whose available energy may be translated into useful mechanical energy by a suitable hydraulic turbine.

BRIEF DESCRIPTION OF THE DRAWINGS

FIG. 2 illustrates another embodiment of the present invention.

FIG. 3 illustrates still another embodiment of the present invention.

DETAILED DESCRIPTION OF THE PREFERRED EMBODIMENT

Figure 1:
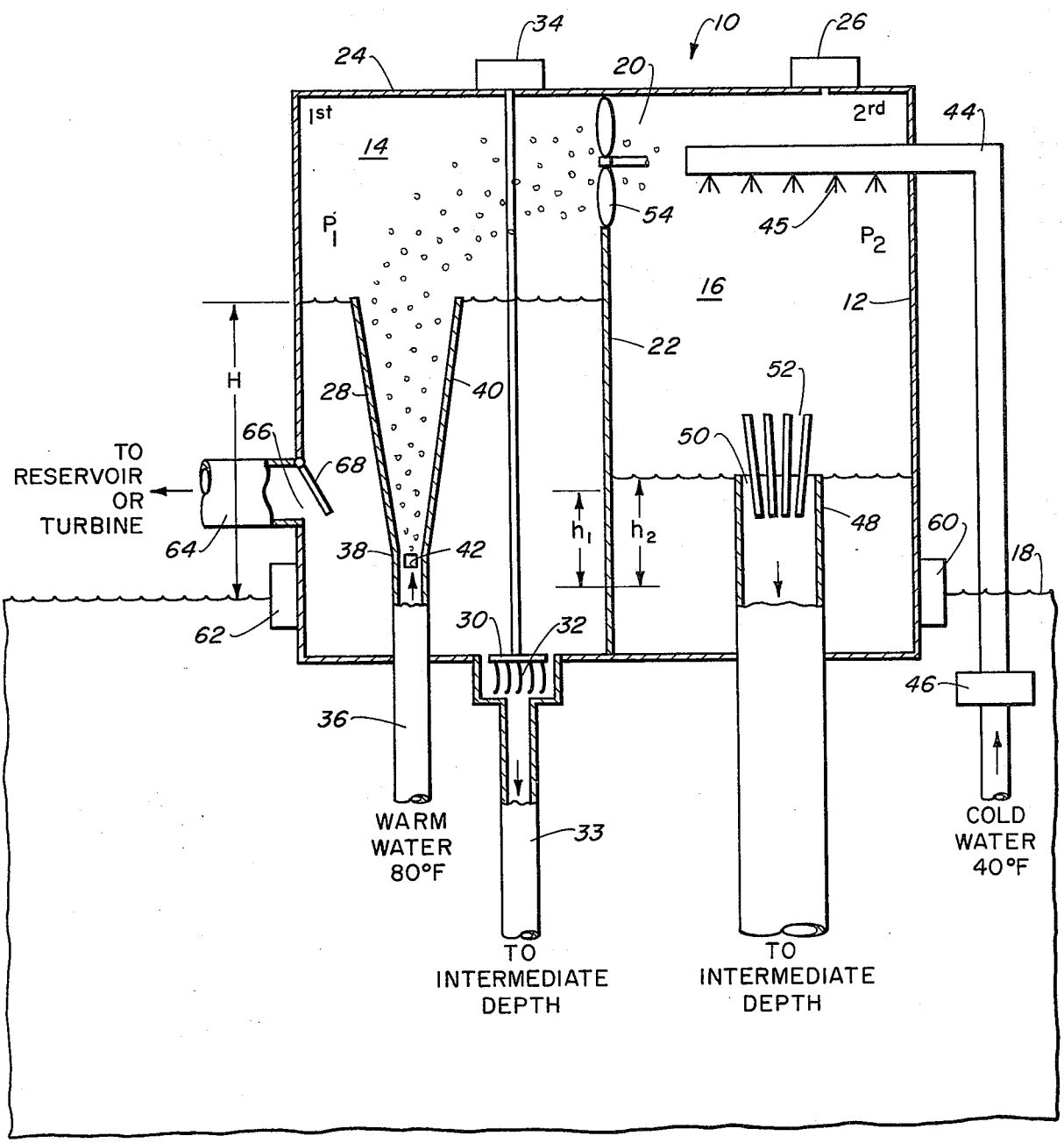
FIG. 1 illustrates an embodiment of the present invention.

Nature has produced what appears by comparison to any other available power source a fortuitous combination of relatively warm water overlying much colder water over much of the earth near the equator. Because of the large areas involved, and the high specific heat of water, the amounts of power which are theoretically available are prodigous.

The following embodiments utilize this difference in temperature (thermal gradient) of the ocean water to produce useful power. Water near the ocean's surface near the equator is typically around 80°F while water in the depth is typically around 40°F. Thus a temperature difference of 40°F is available. It is noted that the warm water near the surface is lighter and contains far more air than the cold water from the depths.

Turning to FIG. 1, one embodiment 10 of an ocean thermal gradient hydraulic power plant is illustrated. Embodiment 10 includes a hull 12 having a pair of barometric compartments 14 and 16. Each compartment 14 and 16 is partially submerged below the ocean surface 18. Compartment 14 and 16 are interconnected by orifice 20 formed by center member 22 and top plate 24.

Vacuum pump 26 evacuates the air from compartments 14 and 16, thus creating a static head in each compartment denoted in FIG. 1 as $h_1$ and $h_2$. The level of $h_1$ is lower than the level of $h_2$ because the pressure in compartment 14 is greater than the pressure in compartment 16. The significance of this pressure differential is discussed infra.

Compartment 14 contains steam lift pump 28. Steam lift pump 28 creates a hydraulic working head H in compartment 14. As shown in FIG. 1, the level of hydraulic working head H is higher than either static head $h_1$ or $h_2$. Center member 22 prevents the water exiting steam lift pump 28 from entering compartment 16. The water from hydraulic working head H exits compartment 14 through orifice 30 and is directed to an intermediate depth beneath ocean surface 18 by pipe 33. Directing the exiting water to an intermediate depth prevents any dilution of the temperature of the water near ocean surface 18. A set of turbine blades 32 located in orifice 30 converts the available energy in the water passing therethrough into useful mechanical energy and subsequently into electrical energy by generator 34.

Steam lift pump 28 includes pipe section 36, Venturi throat section 38 and flared section 40. Pipe section 36 extends downward from compartment 14 into the warm water near ocean surface 18. Venturi throat 38 is located below the level of static head $h_1$. Flared section 40 extends from Venturi throat 38 upwards in compartment 14 to a level just below the level of working hydraulic head H.

As a partial vacuum forms in compartment 14, water rushes through Venturi throat 38, creating steam bubbles (nucleation) in the water causing the steam bubbles and water to move upwards and spill over the top of flared section 40. Also, as the pressure is lowered in compartment 14 so is the boiling point of the water therein. The formation of steam bubbles by moving water through a Venturi throat is thoroughly discussed in Rouse, *Fluid Mechanics for Hydraulic Engineers*, pages 129–133, Dover Press, 1961. The phenomenon of "pumping" by utilizing steam bubbles is somewhat related to the air-lift pump eloquently discussed in Kent, *Mechanical Engineering Handbook*, pages 808–809, 8th Edition, 1916, Steinhope Press, Boston. The level of Venturi throat 38 must be below the level of static head $h_1$ to ensure a continuous flow of water through Venturi throat 38. As the steam bubbles ascend with the loss of static head, the pressure upon them is further reduced, producing additional steam which rapidly expands.

Also, located in Venturi throat 38 is sonic oscillator 42. The pressure reduction necessary for the formation of steam bubbles may not be achieved in some instances solely by rushing water through Venturi throat 38. Thus, sonic oscillator 40 is placed adjacent Venturi throat 38, creating high frequency vibration in the water, thereby inducing nucleation. It is the presence of the desired gaseous phase, whether of liberated dissolved air or steam, that is required to insure nucleation with a small pressure drop. Once nucleation is initiated at a given level, the pressure of the gaseous phase at higher levels insures subsequent nucleation through bubble growth, rather than through successive bubble formation.

As the steam bubbles exit flared section 28, they accelerate toward orifice 20 and enter compartment 16 where they are condensed by barometric condenser 44. Barometric condenser 44 is fed by cold water from the ocean depths, thereby creating a heat sink and a temperature difference between compartments 14 and 16. This temperature difference creates a pressure differential between compartments 14 and 16; thus the steam in compartment 14 accelerates toward orifice 20 and enters compartment 16. Also, this pressure differential is responsible for the difference in the levels of the static heads $h_1$ and $h_2$. Barometric condenser 44 provides the lowest absolute pressure anywhere in the system.

Barometric condenser 44 includes a pump 46. Pump 46 pumps cold water from the ocean depths into barometric condenser 44, ensuring a steady flow of cold water therethrough. Of course, the cold water is pulled upwards in condenser 44 by the low pressure in compartment 16. However, pump 46 is necessary where large depths are required. The cold water from barometric condenser 44 enters compartment 16 as a fine spray denoted by numeral 45.

The water collected in compartment 16 from condensation exits compartment 16 via pipe 48. Pipe 48 extends from the level of static head $h_2$ downwards to an intermediate depth.

Disposed in orifice 50 of pipe 18 is Taylor hydraulic air compressor 52. Compressor 52 consists of a series of tubes and is further described in Kent, *Mechanical Engineering Handbook*, 8th Ed., 1916, Steinhope Press, Boston, page 1914. Compressor 52 removes any air that enters compartments 14 and 16, thereby maintaining the partial vacuum therein necessary for maintaining the static heads $h_1$ and $h_2$ as well as lowering the boiling point of the water in compartment 14. Vacuum pump 26 can perform the same function but pump 26 requires power which compressor 52 does not require.

In summary, barometric condenser 44 creates a pressure differential that accelerates the steam and air in compartment 14 into compartment 16. Once inside compartment 16, the steam is condensed and exits compartment 16 via pipe 48 as does the air due to the Taylor air compressor and the cold spray from condenser 44. Thus, condenser 44 and compressor 52 maintain the conditions in compartment 14 necessary for the continuous operation of the working hydraulic head. The above principles are employed in embodiment 70 of FIG. 2 to maintain proper conditions for continuous injection, and in embodiment 120 of FIG. 3, for maintaining the acceleration of the steam water mixture toward outlet port 136.

Low pressure turbine 54 is located in interconnection 20. Turbine 54 serves as a throttle between compartments 14 and 16 and may be used to produce auxiliary power for pumping. Of course, turbine 54 is not necessary for the successful operation of embodiment 10 but may increase the efficiency of operation thereof.

Adjustable floats 60 and 62 serve to correctly position embodiment 10 in the water. Adjustable floats of variable buoyancy allow for depth adjustment of hull 24 with temperature changes in the ocean to achieve maximum efficiency.

Pipe 64 may be utilized to transport water from hydraulic working head H. Orifice 66 of pipe 64 is located above the level of static head $h_1$. Cover 68 closes orifice 66, thereby preventing any water from exiting compartment 14 via pipe 64. Pipe 64 may transport water to a reservoir or to a turbine.

Now turning to FIG. 2, an embodiment 70 of the present invention is illustrated. Embodiment 70 includes a hull 72 divided into two barometric compartments 74 and 76 by center member 78. Compartments 74 and 76 are partially submerged beneath ocean surface 84.

Vacuum pumps 80 and 82 evacuate the air from compartments 74 and 76, creating a partial vacuum therein. This partial vacuum creates static heads $h_1$ and $h_2$ in compartments 74 and 76, respectively.

With the pressure reduced in compartment 74, steam is formed at the surface 86. Disposed between compartments 74 and 76 is injector or nozzle 88. Injector 88 includes cold water port 90, steam port 92 and steam and water jet port 94. Cold water from the ocean depths is pumped into cold water port 90 via pipe 96 by pump 98. Steam from compartment 74 accelerates through steam port 92 due to the pressure differential between compartments 74 and 76. Steam and cold water are combined in nozzle 88 and exit nozzle 88 as a jet through jet port 94. A turbine 100 whose blades are disposed to receive the jet translates the kinetic energy contained in the steam and water jet into useful mechanical energy. It is noted that nozzle 88 provides the only connection between compartments 74 and 76 above the level of static heads $h_1$ and $h_2$.

Located in compartment 76 is barometric condenser 102. Condenser 102 is fed with cold water from the ocean depths via pipe 104. Condenser 102, serving as a heat sink, creates a temperature difference, hence a pressure difference between compartments 74 and 76. This is the reason the steam in compartment 74 accelerates through nozzle 88 to drive turbine 100. Of course, vacuum pump 80 and 82 maintain a partial vacuum in compartments 74 and 76.

Adjustable floats 106 and 108 maintain hull 72 in the proper position with respect to ocean surface 84.

It is noted that a plurality of nozzles 88 may be utilized to drive turbine 100.

Injector 88 differs from the typical steam injector in at least two respects. The conventional steam injector delivers to a higher pressure than that created from the cold water in pipes 96 and 104. Barometric condenser 102 provides the lowest absolute pressure any place in the system. Also, the water introduced in the nozzle 88 via pipe 96 is warmer than the water introduced to condenser 102 via pipe 104 so the pressure is reduced on the water in pipe 96 to transit, hence some water will evaporate.

Now turning to FIG. 3, an embodiment 120 is illustrated. Embodiment 120 includes hull 122 supported on ocean surface 128 by adjustable floats 124 and 126.

Supported by hull 122 is two-phase nozzle 130. Two-phase nozzle 130 includes a steam-water port 132, a cold water port 134, and a jet outlet port 136. Vacuum pump 138 evacuates the air from nozzle 130, thereby creating a partial vacuum therein and static head $h$.

It is noted that a Taylor compressor may be disposed in the upper portion of turbine blades 160 extending vertically to the lower part of the blades for air eduction. Connected to steam water port 132 is pipe 140. Pipe 140 includes Venturi throat 142, located below the level of static head $h$. Located in the vicinity of Venturi throat 142 is sonic oscillator 144. It is noted that sonic oscillator 144 and 42 (FIG. 1) include piezoelectric crystals, magnetostriction devices, and hydroacoustic oscillators. Venturi throat 142 and sonic oscillator 144 induce nucleation in the warm surface water entering pipe 140 at orifice 146, thereby creating a steam lift pump as described with respect to embodiment 10 of FIG. 1. The steam lift pump creates a hydraulic working head H.

Cold water from the ocean depths enters cold water port 134 via pipe 150 and pump 152. Connected to cold water port 134 and located inside nozzle 130 is fine spray nozzle 154. The spray from fine spray nozzle 154 is directed toward jet outlet port 136. The cold water spray from nozzle 154 creates a temperature differential, hence pressure difference between steam-water port 132 and fine spray nozzle 154. This results in the steam and warm water mixture entering port 132 and accelerating through nozzle 154. The steam and warm water mixture combines with the cold spray and creates a jet exiting nozzle 154 through jet outlet port 136. The jet drives turbine blades 160 of turbine 162 thus translating the kinetic energy in the jet into useful mechanical energy. The water exits turbine blades 160 through pipe 164 to an intermediate depth below ocean surface 128.

It is noted that a plurality of nozzles 130 may be disposed to drive turbine blades 160.

It is also noted that the scientific principles upon which the embodiments of FIGS. 1, 2 and 3 are based are similar. However, the methods of utilizing these principles vary in the embodiments of FIGS. 1, 2 and 3.

Obviously, numerous modifications and variations of the present invention are possible in light of the above teachings. It is therefore to be understood that within the scope of the appended claims the invention may be practiced otherwise than as specifically described herein.

I claim:

1. An ocean thermal gradient hydraulic power plant comprising:
    a. a hull having interconnecting first and second air-evacuated, barometric compartments, each said compartment being partially submerged below the surface of the ocean and having a static hydraulic head therein;
    b. a steam lift pump disposed in said first compartment for creating a working hydraulic head above said static hydraulic head in said first compartment, the interconnection between said first and second compartment being located above the level of said working hydraulic head;
    c. means located in said second compartment for maintaining said working hydraulic head created in said first compartment; and
    d. means located in said first compartment for translating the available energy of said hydraulic working head into mechanical energy.

2. The apparatus of claim 1 wherein said energy translating means includes a turbine.

3. The apparatus of claim 1 wherein said steam lift pump includes:
    a. means partially located in said first compartment for creating nucleation (formation of steam bubbles) in the warm water adjacent the ocean's surface below the level of said static head and transporting this steam-water mixture into said first compartment, said means extending upwards in said first compartment to a point just below the level of said working hydraulic head; whereby said steam-water mixture is pumped to the level of said working hydraulic head; and
    b. second means located below the level of said static head for transporting warm water entering said first compartment via said nucleation creating means to an intermediate depth below the ocean's surface so that the reduced temperature of said exiting warm water does not affect the temperature of said entering warm water.

4. The apparatus of claim 3 wherein said nucleation creating means includes a pipe extending downwards from just below the level of said working hydraulic head in said first compartment to a point outside said first compartment in the warm water adjacent the ocean's surface, said pipe having a Venturi throat located below the level of said static head such that the warm water rushing through said Venturi throat creates nucleation in said water whereby said warm water is raised to the level of said hydraulic working head in said first compartment.

5. The apparatus of claim 4 further including a sonic oscillator located inside said pipe adjacent said Venturi throat for inducing steam bubble formation in said pipe.

6. The apparatus of claim 5 wherein said sonic oscillator includes a piezoelectric crystal.

7. The apparatus of claim 5 wherein said sonic oscillator includes a magnetostriction device.

8. The apparatus of claim 5 wherein said sonic oscillator includes a hydroacoustic oscillator.

9. The apparatus of claim 3 wherein said working hydraulic head maintaining means includes:
   a. a heat sink located adjacent the interconnection between said first and second compartments, said heat sink causing said steam to condense with the resulting water entering said second compartment, said heat sink also creating a pressure differential between said first and second compartment whereby said steam accelerates from said first into said second compartment;
   b. means extending downwards from the level of said static head to an intermediate depth below the ocean's surface for transporting said condensed water out of said second compartment; and
   c. means for removing air from said second compartment, air being carried into said second compartment by said steam.

10. The apparatus of claim 9 wherein said heat sink includes a barometric condenser fed with cold water from the ocean depths.

11. The apparatus of claim 9 wherein said second compartment water transporting means includes a pipe.

12. The apparatus of claim 9 wherein said air removal means includes a Taylor hydraulic air compressor located adjacent said second compartment water transporting means such that the removed air is transported out of said second compartment to an intermediate depth below the ocean's surface.

13. The apparatus of claim 3 further including a sonic oscillator, located inside said nucleation creating means and below said static head, for inducing steam bubble formation in said nucleation creating means.

14. The apparatus of claim 13 wherein said sonic oscillator includes a piezoelectric crystal.

15. The apparatus of claim 13 wherein said sonic oscillator includes a magnetostriction device.

16. The apparatus of claim 13 wherein said sonic oscillator includes a hydroacoustic oscillator.

17. The apparatus of claim 1 further comprising a throttling means for adjusting pressure differences between said first and second compartments located adjacent the interconnection between said first and second compartments.

18. The apparatus of claim 17 wherein said throttling means comprises a low pressure steam turbine.

19. An ocean thermal gradient hydraulic power plant comprising:
   a. a hull having first and second air-evacuated, barometric compartments, each said compartment being partially submerged beneath the warm surface water of the ocean and having a static hydraulic head therein;
   b. a nozzle disposed in said first compartment above the level of said static hydraulic heads for injecting a jet of steam and water into said second compartment, said nozzle having a steam port and a cold water port located in said first compartment, and a steam and water jet port located in said second compartment; and
   c. means for providing cold water to said cold water port, steam being formed at the surface of said static head in said first compartment due to the pressure being lowered therein by air-evacuation, said steam being drawn into said steam port by said pressure differential between said first and second compartment;
   d. means located in said second compartment for maintaining said steam and water injection from said first compartment into said second compartment, said means creating a pressure differential between said first and second compartment; and
   e. means located in said second compartment for translating the kinetic energy contained in said injected steam and water jet into mechanical energy.

20. The apparatus of claim 19 wherein said energy translating means includes a turbine having the blades thereof disposed to receive said injected steam and water jet.

21. The apparatus of claim 19 wherein said cold water providing means includes means extending downwards from said cold water port to cold water located at ocean depths for pumping and pushing the cold water through said cold water port.

22. The apparatus of claim 19 wherein said injection maintaining means includes:
   a. a heat sink located adjacent said steam and water jet for cooling said jet, thereby creating a pressure differential between said first and second compartment;
   b. means for removing air from said second compartment, said air being carried into said second compartment by said steam and water jet.

23. The apparatus of claim 22 wherein said heat sink includes a barometric condenser fed with cold water from the ocean depths.

24. The apparatus of claim 22 wherein said air removal means includes an air compressor.

25. An ocean thermal gradient hydraulic power plant comprising:
   a. two-phase, air-evacuated nozzle means located above the ocean surface having a steam-water port, a cold water port, and a jet outlet port, said cold water port being disposed between said steam-water port and said jet outlet port;
   b. means for creating nucleation (formation of steam bubbles) in the warm water adjacent the ocean's surface, and transporting the steam-water mixture into said nozzle means through said steam-water port;
   c. means for transporting cold water from the ocean depths into said nozzle means through said cold water port, said cold water creating a pressure differential inside said nozzle means, thereby accelerating the flow of said steam-water mixture toward said jet outlet port;
   d. means connected to receive a jet comprised of a mixture of condensed steam, warm water and cold water exiting said nozzle means through said jet outlet port for transporting said jet to an intermediate depth below the ocean's surface so that the reduced temperature of said exiting warm water does not affect the temperature of said warm water near the ocean's surface; and e. means adjacent said jet receiving means for translating the kinetic energy contained in said jet into mechanical energy.

26. The apparatus of claim 25 further including means for removing the air from said nozzle means.

27. The apparatus of claim 25 wherein said nucleation creating means includes a pipe having a Venturi throat therein, said Venturi throat being located beneath the ocean surface.

28. The apparatus of claim 27 further including a sonic oscillator located inside said pipe adjacent said Venturi throat for inducing steam bubble formation in said pipe.

29. The apparatus of claim 28 wherein said sonic oscillator includes a piezoelectric crystal.

30. The apparatus of claim 28 wherein said sonic oscillator includes a magnetostriction device.

31. The apparatus of claim 28 wherein said sonic oscillator includes a hydroacoustic oscillator.

32. The apparatus of claim 25 wherein said nucleation creating means includes a sonic oscillator located below the ocean surface for inducing steam bubble formation in said nucleation creating means.

33. The apparatus of claim 32 wherein said sonic oscillator includes a piezoelectric crystal.

34. The apparatus of claim 32 wherein said sonic oscillator includes a magnetostriction device.

35. The apparatus of claim 32 wherein said sonic oscillator includes a hydroacoustic oscillator.

36. The apparatus of claim 25 wherein said nozzle means includes means for creating a fine spray of cold water inside said nozzle means substantially in the direction of said jet outlet port, said fine spray creating means being connected to said cold water port.

37. The apparatus of claim 25 wherein said kinetic energy translating means includes a turbine.

38. The apparatus of claim 25 further including air evacuation means disposed inside said transporting means.

39. The apparatus of claim 38 wherein said air evacuation means includes a Taylor air compressor.

40. A method of generating power from the thermal gradient of the ocean comprising the steps of:
a. creating a pressure differential between first and second air-evacuated, barometric compartments, said second compartment having the lowest pressure therebetween, said first compartment having a static head therein;
b. creating steam bubbles in the warm water near the ocean surface beneath the level of said static head in a conduit located in said first compartment such that said steam bubbles pump said warm water to a level above said static head, thus creating a working hydraulic head;
c. continuously removing air from said first and second compartment;
d. driving a set of turbine blades with the water from said hydraulic working head.

41. The method of claim 40 wherein the step of creating a pressure differential includes the step of disposing a heat sink in said second compartment.

42. The method of claim 41 wherein the step of disposing a heat sink includes the step of pumping cold water from the ocean depths into a barometric condenser located in said second compartment.

43. The method of claim 40 further comprising, after the step of creating a pressure differential, the step of throttling the pressure differential between said first and second compartment.

44. A method of generating power from the thermal gradient of the ocean comprising the steps of:
a. creating a pressure differential between first and second air-evacuated, barometric compartments, said second compartment having the lowest pressure therebetween;
b. injecting a mixture of steam and cold water into said second compartment from said first compartment, said pressure differential causing said mixture to accelerate into said second compartment;
c. driving a set of turbine blades with said injected mixture; and
d. continuously removing air from said first and second compartment.

45. The method of claim 44 wherein the step of creating a pressure differential includes the step of disposing a heat sink in said second compartment.

46. The method of claim 45 wherein the step of disposing a heat sink includes the step of pumping cold water from the ocean depths into a barometric condenser located in said second compartment.

47. The method of claim 44 wherein the step of injecting includes the steps of:
a. creating a source of steam in said first compartment;
b. disposing a nozzle having a cold water port and a steam port in said first compartment and a cold water-steam mixture outlet port in said second compartment between said first and second compartments, said cold water port being disposed between said steam port and said mixture outlet port; and
c. pumping cold water into said cold water port such that said steam accelerates through said nozzle due to said pressure differential between said first and second compartment, said steam mixing with said cold water and the resulting mixture jetting into said second compartment.

48. The method of claim 47 wherein the step of creating a source of steam includes the step of boiling the warm ocean water near the surface.

49. A method of generating power from the thermal gradient of the ocean comprising the steps of:
a. providing an air-evacuated nozzle having a static head therein, said nozzle having an inlet port, an outlet port and a cold water port, said cold water port being disposed between said inlet and said outlet port;
b. providing a mixture of steam bubbles and warm water by creating steam bubbles in the warm water near the ocean surface beneath the level of said static head in a conduit connected to said inlet port such that said steam bubbles pump said warm water to the level of a working hydraulic head above the level of said static head in said nozzle.
c. injecting a fine spray of cold water into said cold water port in the direction of said outlet port such that said mixture of steam bubbles and warm water accelerates through said nozzle exiting through said outlet port;
d. continuously removing air from said nozzle;
e. driving a set of turbine blades with said mixture exiting said outlet port.

50. The method of claim 49 wherein the step of creating a pressure differential includes the step of disposing a heat sink near said outlet port.

* * * * *